United States Patent [19]

Wolfe et al.

[11] Patent Number: 5,509,669

[45] Date of Patent: Apr. 23, 1996

[54] GAS-PATH LEAKAGE SEAL FOR A GAS TURBINE

[75] Inventors: Christopher E. Wolfe, Schenectady; Osman S. Dinc, Troy; Bharat S. Bagepalli, Schenectady; Victor H. Correia, New Lebanon; Mahmut F. Aksit, Troy, all of N.Y.

[73] Assignee: General Electric Company, Schenectady, N.Y.

[21] Appl. No.: 491,757

[22] Filed: Jun. 19, 1995

[51] Int. Cl.⁶ ..................................................... F16J 15/12
[52] U.S. Cl. ........................ 277/167.5; 277/230; 277/236; 415/173.7; 415/174.2
[58] Field of Search ............................ 277/167.5, 230, 277/233, 236; 415/170.1, 173.6, 173.7, 174.2

[56] References Cited

U.S. PATENT DOCUMENTS

| | | |
|---|---|---|
| 271,390 | 1/1883 | Woodruff . |
| 625,155 | 5/1899 | Dresser . |
| 2,194,266 | 7/1937 | Allen . |
| 2,587,057 | 2/1952 | McVeigh ........................... 415/173.7 |
| 3,113,526 | 12/1963 | Paschke . |
| 3,271,039 | 9/1966 | Kohl et al. . |
| 3,754,766 | 8/1973 | Asplund ............................... 277/236 |
| 3,970,318 | 7/1976 | Tuley . |
| 4,415,309 | 11/1983 | Atterbury . |
| 4,626,002 | 12/1986 | Hagemeister et al. . |
| 4,645,217 | 2/1987 | Honeycutt et al. . |
| 4,730,876 | 3/1988 | Werner et al. . |
| 4,854,600 | 8/1989 | Halling et al. ........................... 277/236 |
| 4,932,207 | 6/1990 | Haris et al. ........................... 415/174.2 |
| 5,104,286 | 4/1992 | Donlan . |
| 5,221,096 | 6/1993 | Heldreth et al. . |
| 5,265,412 | 11/1993 | Bagepalli et al. . |

FOREIGN PATENT DOCUMENTS 0135653 6/1988 Japan .

*Primary Examiner*—Scott W. Cummings
*Attorney, Agent, or Firm*—Douglas E. Erickson; Paul R. Webb, II

[57] ABSTRACT

A gas-path leakage seal for generally sealing a gas-path leakage-gap between spaced-apart first and second members of a gas turbine (such as combustor casing segments). The seal includes a generally imperforate foil-layer assemblage which is generally impervious to gas and is located in the leakage-gap. The seal also includes a cloth-layer assemblage generally enclosingly contacting the foil-layer assemblage. In one seal, the first edge of the foil-layer assemblage is left exposed, and the foil-layer assemblage resiliently contacts the first member near the first edge to reduce leakage in the "plane" of the cloth-layer assemblage under conditions which include differential thermal growth of the two members. In another seal, such leakage is reduced by having a first weld-bead which permeates the cloth-layer assemblage, is attached to the metal-foil-layer assemblage near the first edge, and unattachedly contacts the first member.

10 Claims, 2 Drawing Sheets

GAS-PATH LEAKAGE SEAL FOR A GAS TURBINE

This invention was made with Government support under Government Contract No. DEAC21-93-MC30244 awarded by the Department of Energy. The Government has certain rights to this invention.

BACKGROUND OF THE INVENTION

The present invention relates generally to gas turbines, and more particularly to a gas-path leakage seal for a gas turbine.

Gas turbines include, but are not limited to, gas turbine power generation equipment and gas turbine aircraft engines. A gas turbine has a gas path which typically includes, in serial-flow relationship, an air intake (or inlet), a compressor, a combustor, a turbine, and a gas outlet (or exhaust nozzle). Gas leakage, either out of the gas path or into the gas path, from an area of higher pressure to an area of lower pressure is generally undesirable. For example, gas-path leakage in the turbine area of a gas turbine will lower the efficiency of the gas turbine leading to increased fuel costs. Also, gas-path leakage in the combustor area of a gas turbine will require an increase in burn temperature to maintain power level, such increased burn temperature leading to increased pollution, such as increased NOx and CO production.

Gas-path leakage occurs through gaps between gas turbine subassemblies such as through gaps between the combustor and the turbine, and gas-path leakage occurs through gaps between the components that make up a gas turbine subassembly, such as through gaps between combustor casing segments. Such components and subassemblies have surfaces of different shapes, suffer from assembly misalignment, and undergo vibration. Hot-section components thermally experience hot gas flow and typically undergo different thermal growths. Conventional seals are used to reduce such leakage. For example, a conventional rigid or leaf seal made of metal may have a leakage of 2.4% (primarily from flow around the seal due to different surface shapes, assembly misalignment, vibration, thermal growth, and/or wear). Such leakage in the combustor may result in a 15 (or much higher) parts-per-million (ppm) NOx production and a similar CO production. What is needed is an improved gas-path leakage seal for a gas turbine which will further increase efficiency and further decrease pollution, such as further decreasing NOx and CO production.

SUMMARY OF THE INVENTION

It is an object of the invention to provide a gas-path leakage seal for a gas turbine.

The gas-path leakage seal of the invention is for generally sealing a gas-path leakage-gap between spaced-apart first and second members of a gas turbine. In a first embodiment, the seal includes a generally imperforate foil-layer assemblage and a cloth-layer assemblage. The foil-layer assemblage is generally impervious to gas, is located in the leakage-gap, and has a first edge. The foil-layer assemblage resiliently contacts the first member near the first edge of the foil-layer assemblage. The cloth-layer assemblage contacts the first and second members. The cloth-layer assemblage generally enclosingly contacts the foil-layer assemblage leaving the first edge of the foil-layer assemblage exposed.

In a second embodiment of the gas-path leakage seal of the invention, the seal includes a generally imperforate metal-foil-layer assemblage, a cloth-layer assemblage, and a first weld-bead. The metal-foil-layer assemblage is generally impervious to gas, is located in the leakage-gap, and has a first edge. The cloth-layer assemblage contacts the first and second members. The cloth-layer assemblage generally enclosingly contacts the metal-foil-layer assemblage. The first weld-bead permeates the cloth-layer assemblage, is attached to the metal-foil-layer assemblage near the first edge of the metal-foil-layer assemblage, and unattachedly contacts the first member.

Several benefits and advantages are derived from the invention. The foil-layer (or metal-foil-layer) assemblage of the seal offers good sealing of gas flow moving in a direction generally perpendicular to a surface of the foil-layer (or metal-foil-layer) assemblage. The cloth-layer assemblage offers some sealing, good wear resistance, and good flexibility. Good flexibility means the seal is very compliant and can accommodate surfaces of different shapes, assembly misalignment, vibration, and differential thermal growth. The exposed first edge (or the first weld-bead) contacting the first member offers good sealing of gas flow that would otherwise leak around the first edge of the foil-layer (or metal-foil-layer) assemblage and through the cloth-layer assemblage moving in a direction generally parallel to a surface of the foil-layer (or metal-foil-layer) assemblage. Initial gas turbine combustor tests showed a gas-path leakage of generally 0.4% with the seal of the invention compared to a gas-path leakage of 2.4% with a conventional metal rigid seal. It is expected that such improved gas-path leakage using the seal of the invention will result in a correspondingly lower NOx and CO production that will meet future governmental pollution standards of 9 ppm NOx production and 9 ppm CO production.

BRIEF DESCRIPTION OF THE DRAWINGS

The accompanying drawings illustrate several preferred embodiments of the present invention wherein.

DETAILED DESCRIPTION OF THE INVENTION

Figure 1:
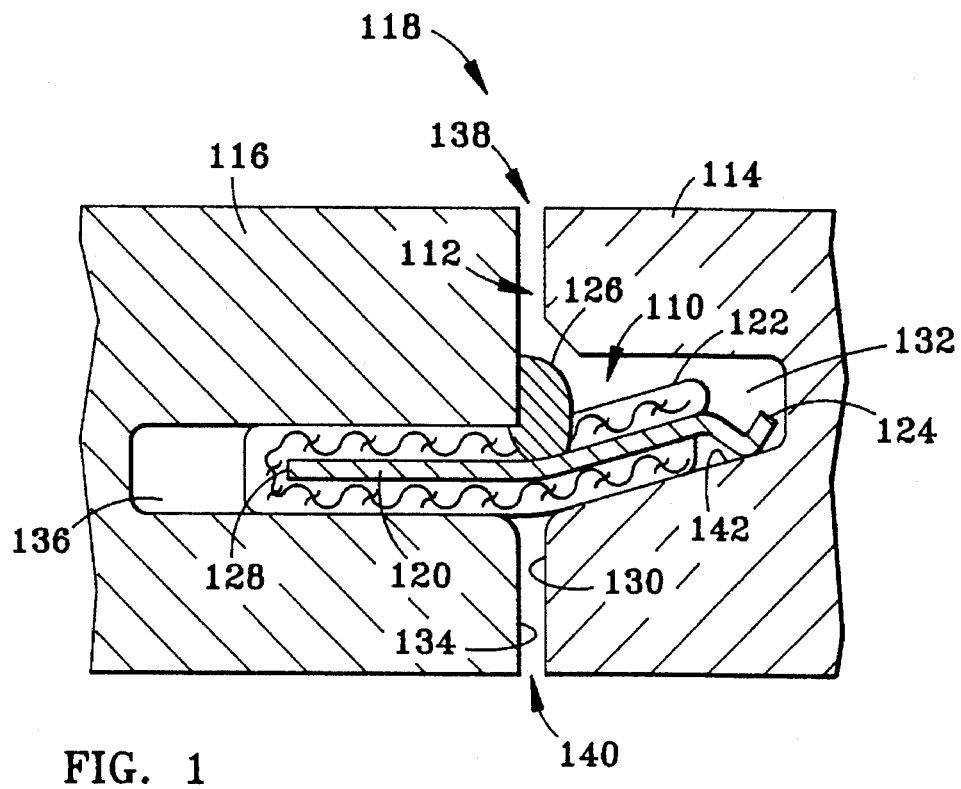
FIG. 1 is a schematic cross-sectional view of a first preferred embodiment of the seal of the present invention wherein the seal is installed in two slots and wherein the seal is attached to a gas-turbine member by a weld-bead.

Referring now to the drawings, wherein like numerals represent like elements throughout, FIG. 1 schematically shows a first preferred embodiment of the gas-path leakage seal 110 of the present invention. The gas-path leakage seal 110 is for generally sealing a gas-path leakage-gap 112 between spaced-apart first and second members 114 and 116 of a gas turbine 118 (only a small portion of which is shown in FIG. 1). Preferably, the first and second members 114 and 116 are first and second segments of a gas turbine combustor casing. The seal 110 includes a generally imperforate foil-layer assemblage 120 and a cloth-layer assemblage 122. The foil-layer assemblage 120 is generally impervious to gas, is disposed in the gas-path leakage-gap 112, and has a first edge 124. The foil-layer assemblage 120 resiliently contacts the first member 114 proximate the first edge 124 of the foil-layer assemblage 120. The cloth-layer assemblage 122 contacts the first and second members 114 and 116. The cloth-layer assemblage 122 generally enclosingly contacts the foil-layer assemblage 120 leaving the first edge 124 of the foil-layer assemblage 120 exposed. The resilient contact of the foil-layer assemblage 120 maintains sealing while allowing for different surface shapes, assembly misalignment, vibration, and/or thermally-induced relative movement between the first and second members 114 and 116.

The foil-layer assemblage 120 of seal 110 comprises at least one layer of foil (as shown in FIG. 1). The foil-layer assemblage 120 may comprise at least two superimposed and preferably identical layers of foil having staggered slots for added flexibility. The foil comprises (and preferably consists essentially of) metal, ceramic, and/or polymer foil. The choice of materials for the foil and the choice of the thickness for a layer are made by the artisan to meet the sealing and flexibility requirements of a particular seal application. Preferably, the foil-layer assemblage 120 has no more than four layers of foil. Preferably, the foil-layer assemblage 120 has a thickness of generally between five and ten thousandths of an inch, and each foil layer comprises a high-temperature, cobalt-based super-alloy, such as L-605. It is noted that the foil layers can comprise different materials and/or have different thicknesses depending on the particular seal application.

The cloth-layer assemblage 122 of seal 110 comprises at least one layer of cloth (as shown in FIG. 1). The clothelayer assemblage 120 may comprise at least two overlying layers of cloth. A cloth layer comprises (and preferably consists essentially of) metal, ceramic, and/or polymer fibers which have been woven, knitted, or pressed into a layer of fabric. The choice of layer construction (i.e., woven, knitted, or pressed), the choice of materials for the cloth, and the choice of the thickness for a layer are made by the artisan to meet the wear resistance, flexibility, and sealing requirements of a particular seal application. Preferably, the cloth-layer assemblage 122 has no more than two layers of cloth. It is noted that such multiple cloth layers can comprise different materials, different layer construction (i.e., woven, knitted, or pressed) and/or have different thicknesses depending on the particular seal application. Preferably, each cloth layer is a woven cloth layer.

Applicants have discovered a superior cloth layer for use in the cloth-layer assemblage 122. Such superior cloth layer is flexible and offers a significant improvement in sealing ability compared with that of conventional cloth seals. The superior cloth layer is a twilled metal cloth. By "twilled" is meant a cloth having a twill weave (such as a twill weave which floats weft threads over two warp threads and which staggers these floats regularly). Preferably, the metal is the high-temperature, cobalt-based super-alloy L-605. In a first preferred construction, the cloth layer has 30 warp wires per inch and 250 weft wires per inch with each warp and weft wire having a thickness of 7 mils and with the cloth layer having an overall thickness of 0.027 inch. In a second preferred construction, the cloth layer has 20 warp wires per inch and 250 weft wires per inch with each warp wire having a thickness of 10 mils and each weft wire having a thickness of 8 mils and with the cloth layer having an overall thickness of 0.025 inch. It is noted that the leakage in the "plane" of the cloth layer, when the cloth-layer assemblage 122 is against the foil-layer assemblage 120, is reduced in the weft, diagonal, and warp directions. For purposes of describing the invention, the "plane" of the cloth layer is defined to be a surface of the cloth layer and is flat only when the cloth layer is against a flat foil-layer assemblage 120. It is pointed out that many gas-turbine seal applications (such as between combustor casing segments) will require curved foil-layer assemblages.

In an exemplary embodiment, the foil-layer assemblage 120 consists essentially of metal, and the seal 110 also includes a weld-bead 126 permeating the cloth-layer assemblage 122 attaching together the foil-layer assemblage 120 and the second member 116. In this design, the foil-layer assemblage 120 preferably is spaced apart from the second member 116 and has a second edge 128 generally opposite the first edge 124 and enclosed by the cloth-layer assemblage 122. It is preferred that the weld-bead 126 is disposed between the first and second edges 124 and 128.

In a preferred seal installation, the first member 114 has a first surface 130 with a first slot 132, and the second member 116 has a second surface 134 with a second slot 136 generally opposing the first slot 132. The first edge 124 of the foil-layer assemblage 120 is disposed within the first slot 132, and the second edge 128 of the foil-layer assemblage 120 is disposed within the second slot 136. The gas-path leakage-gap 112 has a higher-pressure end 138 and a lower-pressure end 140. Preferably, the first slot 132 has a slot wall surface 142 generally facing the higher-pressure end 138 and inclined toward the second surface 134. In an exemplary embodiment, the foil-layer assemblage 120 is bent toward the slot wall 142 proximate the first edge 124. Such design uses the high pressure to help seat the seal 110 and the exposed first edge 124 of the foil-layer assemblage 120 against the slot wall 142 of the first member 114.

Figure 2:
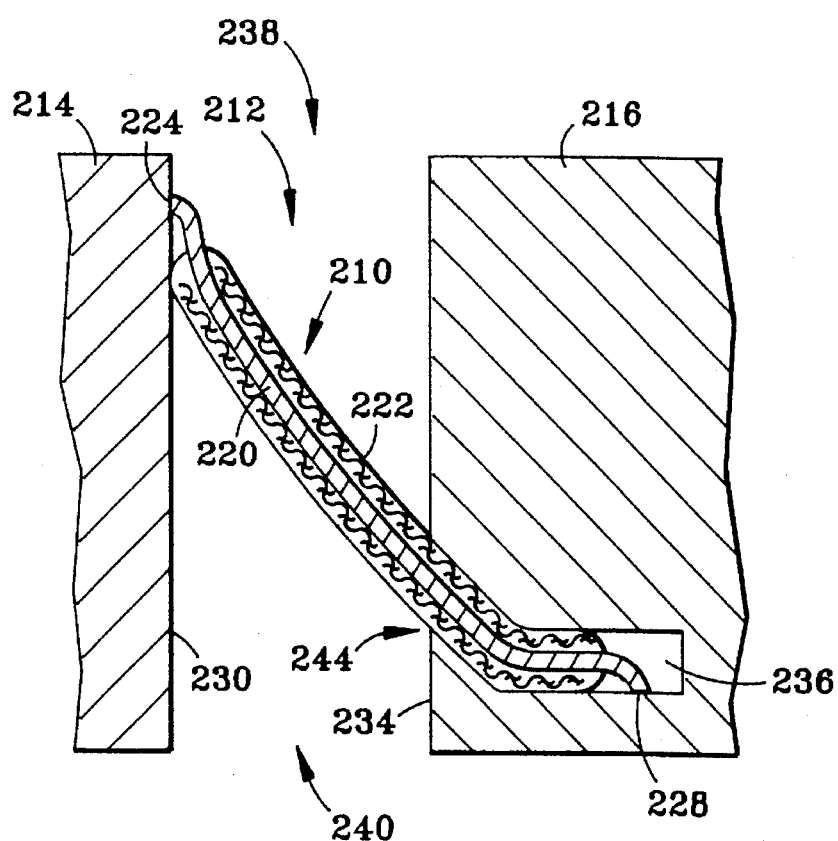
FIG. 2 is a schematic cross-sectional view of a second preferred embodiment of the seal wherein the seal is installed in one slot and wherein the seal lacks a weld-bead.

FIG. 2 schematically shows a second preferred embodiment of the gas-path leakage seal 210 of the present invention. Seal 210 is identical to seal 110 of the previously-described first preferred embodiment with differences as hereinafter noted. Seal 210 lacks the weld-bead 126 of seal 110. Instead, the foil-layer assemblage 220 of seal 210 has a second edge 228 generally opposite the first edge 224 and left exposed by the cloth-layer assemblage 222, and the foil-layer assemblage 220 resiliently contacts the second member 216 proximate the second edge 228 of the foil-layer assemblage 220. It is noted that, as with seal 110, seal 210 has the first edge 224 of the foil-layer assemblage 220 left exposed by the cloth-layer assemblage 222 and has the foil-layer assemblage 220 resiliently contact the first member 214 proximate the first edge 224 of the foil-layer assemblage 220. It is also noted that "proximate" the first and second edges 224 and 228 includes "at" the first and second edges 224 and 228, as shown in FIG. 2.

In a preferred seal installation, the first member 214 has a first surface 230, and the second member 216 has a second surface 234 with a slot 236. The first edge 224 of the foil-layer assemblage 220 resiliently contacts the first surface 230, and the second edge 228 of the foil-layer assemblage 220 is disposed within the slot 236. The gas-path leakage-gap 212 has a higher-pressure end 238 and a lower-pressure end 240. The slot 236 has a surface opening 244, and preferably the slot 236 is inclined toward the higher pressure end 238 proximate the surface opening 244.

Figure 3:
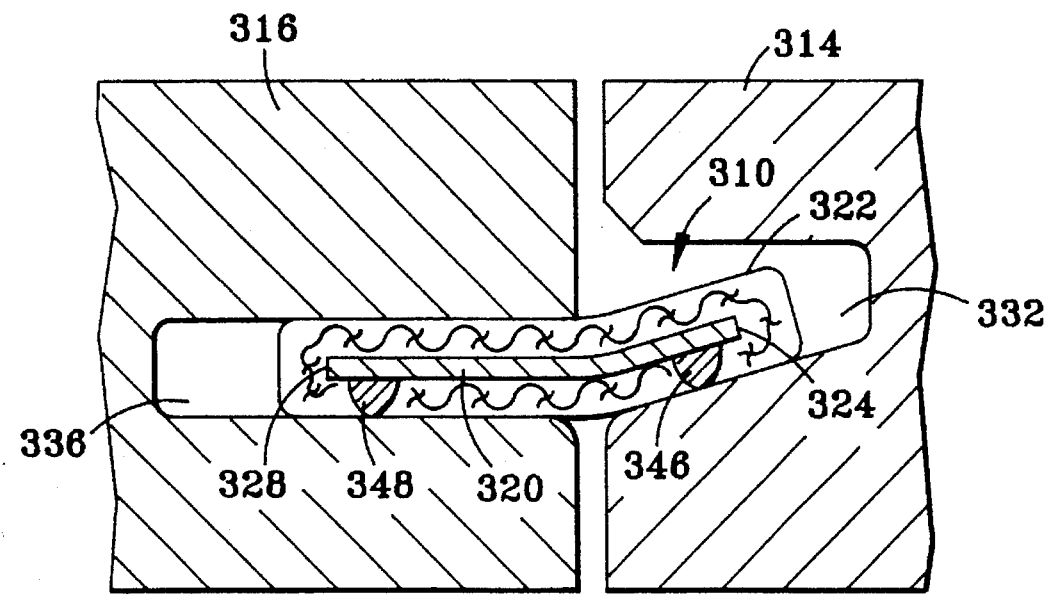
FIG. 3 is a schematic cross-sectional view of a third preferred embodiment of the seal wherein the seal includes two weld-beads.

A third preferred embodiment of the seal 310 of the present invention is schematically shown in FIG. 3. Seal 310 is identical to seal 110 of the previously-described first preferred embodiment with differences as hereinafter noted.

Seal 310 lacks several features of seal 110 including: the weld-bead 126, the exposed first edge 124, and the foil-layer assemblage 120 resiliently contacting the first member 114. Instead, the foil-layer assemblage of seal 310 is a metal-foil-layer assemblage 320. Also, seal 310 further includes a first weld-bead 346 which permeates the cloth-layer assemblage 322, is attached to the metal-foil-layer assemblage 320 proximate the first edge 324, and unattachedly contacts the first member 314.

In an exemplary embodiment, seal 310 additionally includes a second weld-bead 348 which permeates the cloth-layer assemblage 322, is attached to the metal-foil-layer assemblage 320 proximate the second edge 328, and unattachedly contacts the second member 316. In a preferred seal installation of seal 310 shown in FIG. 3, the first and second edges 324 and 328 of the metal-foil-layer assemblage 320 are installed in slots 332 and 336 of the first and second members 314 and 316 in the same previously-described manner as seal 110 shown in FIG. 1. Of course, seal 310 lacks the weld-bead 126 and the exposed first edge 124 of seal 110 with the first and second weld-beads 346 and 348 of seal 310 performing the same function of reducing leakage in the "plane" of the cloth-layer assemblage 322. It is noted that the unattached contact of the first and second weld-beads 346 and 348 with the first and second members 314 and 316 maintains sealing while allowing for different surface shapes, assembly misalignment, vibration, and/or thermally-induced relative movement between the first and second members 314 and 316.

Figure 4:
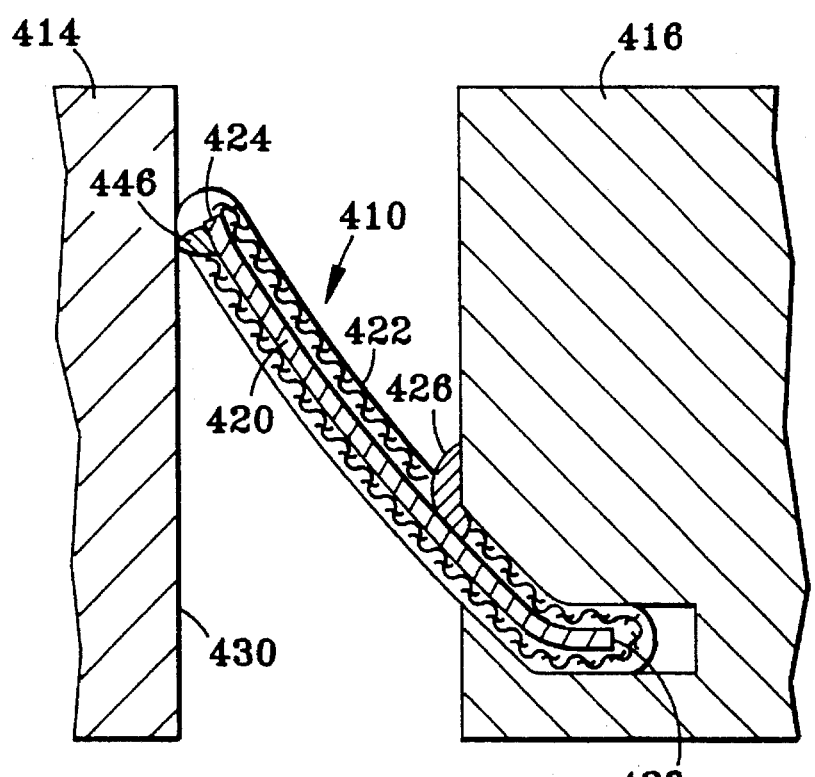
FIG. 4 is a schematic cross-sectional view of a fourth preferred embodiment of the seal wherein the seal includes one weld-bead.

FIG. 4 shows a fourth preferred embodiment of the seal 410 of the present invention. Seal 410 is identical to seal 210 of the previously-described second preferred embodiment with differences as hereinafter noted. Seal 410 lacks several features of seal 210 including the exposed first and second edges 124 and 128. Instead, the foil-layer assemblage of seal 410 is a metal-foil-layer assemblage 420. Also, seal 410 further includes a first weld-bead 446 which permeates the cloth-layer assemblage 422, is attached to the metal-foil-layer assemblage 420 proximate the first edge 424, and unattachedly contacts the first member 414. Moreover, seal 410 additionally includes a weld-bead 426 permeating the cloth-layer assemblage 422 attaching together the metal-foil-layer assemblage 420 and the second member 416. Here, the metal-foil-layer assemblage 420 is spaced apart from the second member 416 and has its second edge 428 enclosed by the cloth-layer assemblage 422. Also, the weld-bead 426 is disposed between the first and second edges 424 and 428.

A preferred installation of seal 410 shown in FIG. 4 is identical to the installation of seal 210 shown in FIG. 2 with differences as hereinafter noted. The first weld-bead 446 of seal 410 (instead of the exposed first edge 224 of seal 210) unattachedly contacts the first surface 430 of the first member 414, and the second member's 216 contact with the exposed second edge 228 of seal 210 is replaced with the second member's 416 attachment to the weld-bead 426 of seal 410 to reduce leakage in the "plane" of the cloth-layer assemblage 422.

The foregoing description of several preferred embodiments of the invention has been presented for purposes of illustration. It is not intended to be exhaustive or to limit the invention to the precise form disclosed, and obviously many modifications and variations are possible in light of the above teaching. It is noted that the terms weld-bead and weld-bead have been used to describe the invention. With such terms, it is understood that welding includes, without limitation, brazing and that brazing includes, without limitation, soldering. It is intended that the scope of the invention be defined by the claims appended hereto.

We claim:

1. A gas-path leakage seal for generally sealing a gas-path leakage-gap between spaced-apart first and second members of a gas turbine, said seal comprising:

a) a generally imperforate foil-layer assemblage generally impervious to gas, disposed in said gas-path leakage-gap, and having a first edge, wherein said foil-layer assemblage resiliently contacts said first member proximate said first edge; and b) a cloth-layer assemblage contacting said first and second members, wherein said cloth-layer assemblage generally enclosingly contacts said foil-layer assemblage leaving said first edge exposed.

2. The seal of claim 1, wherein said foil-layer assemblage consists essentially of metal, and also including a weld-bead permeating said cloth-layer assemblage attaching together said foil-layer assemblage and said second member, wherein said foil-layer assemblage is spaced apart from said second member and has a second edge generally opposite said first edge and enclosed by said cloth-layer assemblage, and wherein said weld-bead is disposed between said first and second edges.

3. The seal of claim 1, wherein said foil-layer assemblage has a second edge generally opposite said first edge and left exposed by said cloth-layer assemblage, and wherein said foil-layer assemblage resiliently contacts said second member proximate said second edge.

4. The seal of claim 1, wherein said foil-layer assemblage has a second edge generally opposite said first edge, said first member has a first surface with a first slot, said second member has a second surface with a second slot generally opposing said first slot, said first edge is disposed within said first slot, said second edge is disposed within said second slot, said gas-path leakage-gap has a higher-pressure end and a lower-pressure end, said first slot has a slot wall surface generally facing said higher-pressure end and inclined toward said second surface.

5. The seal of claim 1, wherein said first member has a first surface, said second member has a second surface with a slot, said first edge resiliently contacts said first surface, said second edge is disposed within said slot, said gas-path leakage-gap has a higher-pressure end and a lower-pressure end, said slot has a surface opening, and said slot is inclined toward said higher pressure end proximate said surface opening.

6. A gas-path leakage seal for generally sealing a gas-path leakage-gap between spaced-apart first and second members of a gas turbine, said seal comprising:

a) a generally imperforate metal-foil-layer assemblage generally impervious to gas, disposed in said gas-path leakage-gap, and having a first edge;

b) a cloth-layer assemblage contacting said first and second members, wherein said cloth-layer assemblage generally enclosingly contacts said metal-foil-layer assemblage; and c) a first weld-bead permeating said cloth-layer assemblage, attached to said metal-foil-layer assemblage proximate said first edge, and unattachedly contacting said first member.

7. The seal of claim 6, also including a second weld-bead permeating said cloth-layer assemblage attaching together said metal-foil-layer assemblage and said second member, wherein said metal-foil-layer assemblage is spaced apart from said second member and has a second edge generally opposite said first edge and enclosed by said cloth-layer assemblage, and wherein said second weld-bead is disposed between said first and second edges.

8. The seal of claim 6, wherein said metal-foil-layer assemblage has a second edge generally opposite said first edge, and also including a second weld-bead permeating said cloth-layer assemblage, attached to said metal-foil-layer assemblage proximate said second edge, and unattachedly contacting said second member.

9. The seal of claim 6, wherein said metal-foil-layer assemblage has a second edge generally opposite said first edge, said first member has a first surface with a first slot, said second member has a second surface with a second slot generally opposing said first slot, said first edge is disposed within said first slot, said second edge is disposed within said second slot, said gas-path leakage-gap has a higher-pressure end and a lower-pressure end, said first slot has a slot wall surface generally facing said higher-pressure end and inclined toward said second surface.

10. The seal of claim 6, wherein said first member has a first surface, said second member has a second surface with a slot, said first weld-bead contacts said first surface, said second edge is disposed within said slot, said gas-path leakage-gap has a higher-pressure end and a lower-pressure end, said slot has a surface opening, and said slot is inclined toward said higher pressure end proximate said surface opening.

* * * * *